US011111792B2

United States Patent
Goodhand et al.

(10) Patent No.: US 11,111,792 B2
(45) Date of Patent: *Sep. 7, 2021

(54) TURBOMACHINERY

(71) Applicant: ROLLS-ROYCE plc, London (GB)

(72) Inventors: Martin N Goodhand, Derby (GB); Ian M Bunce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,976

(22) Filed: Feb. 22, 2019

(65) Prior Publication Data

US 2020/0063566 A1 Feb. 27, 2020

(30) Foreign Application Priority Data

Aug. 24, 2018 (GB) ..................... 1813822

(51) Int. Cl.
*F04D 29/28* (2006.01)
*F01D 5/14* (2006.01)
*F04D 17/10* (2006.01)

(52) U.S. Cl.
CPC ............ *F01D 5/141* (2013.01); *F04D 17/10* (2013.01); *F04D 29/284* (2013.01); *F05D 2210/12* (2013.01); *F05D 2220/30* (2013.01); *F05D 2240/301* (2013.01)

(58) Field of Classification Search
CPC .......... F02C 1/10; F02C 1/105; F01K 25/103; F04D 29/441; F04D 29/44; F04D 29/30; F04D 29/284
See application file for complete search history.

(56) References Cited

U.S. PATENT DOCUMENTS

| | | | | |
|---|---|---|---|---|
| 5,145,317 A | * | 9/1992 | Brasz | F04D 29/444 |
| | | | | 415/203 |
| 6,499,954 B1 | * | 12/2002 | Adonakis | F04D 29/30 |
| | | | | 416/185 |
| 7,686,586 B2 | * | 3/2010 | Nikpour | F04D 29/284 |
| | | | | 416/223 A |
| 8,157,516 B2 | | 4/2012 | Chen et al. | |
| 9,033,667 B2 | * | 5/2015 | Iwakiri | F04D 29/284 |
| | | | | 416/183 |

(Continued)

FOREIGN PATENT DOCUMENTS

| | | |
|---|---|---|
| CN | 206943027 U | 1/2018 |
| CN | 207647800 U | 7/2018 |

(Continued)

OTHER PUBLICATIONS

"The development technology and applications of supercritical CO2 power cycle in nuclear energy, solar energy and other energy industries"; Published Jul. 25, 2017 (Year: 2017).*

(Continued)

*Primary Examiner* — Justin D Seabe
(74) *Attorney, Agent, or Firm* — Oliff PLC

(57) ABSTRACT

A turbomachine (105) configured to compress supercritical carbon dioxide is shown. The turbomachine comprises, in fluid flow series, an inlet (201), an inducerless radial impeller (202) having a plurality of blades, and a fully vaneless diffuser (203). The radius of the inlet ($r_0$) is from 25 to 50 percent of the radius of the impeller ($r_2$).

20 Claims, 3 Drawing Sheets

(56) References Cited

U.S. PATENT DOCUMENTS

| | | | |
|---|---|---|---|
| 9,541,094 B2* | 1/2017 | Iwakiri | F04D 29/4206 |
| 9,976,566 B2* | 5/2018 | Hildebrandt | F04D 17/00 |
| 10,006,290 B2* | 6/2018 | Houst | F01D 5/02 |
| 10,474,787 B2* | 11/2019 | Choi | F04D 15/0088 |
| 10,844,872 B2 | 11/2020 | Godo et al. | |
| 2006/0115358 A1 | 6/2006 | Umeyama et al. | |
| 2011/0305554 A1 | 12/2011 | Chen et al. | |
| 2014/0105736 A1 | 4/2014 | Kiriaki | |
| 2014/0308110 A1 | 10/2014 | Houst et al. | |
| 2017/0276142 A1 | 9/2017 | Graham | |
| 2017/0314572 A1 | 11/2017 | Badeau et al. | |
| 2018/0347382 A1* | 12/2018 | Iwakiri | F04D 29/441 |
| 2019/0032671 A1* | 1/2019 | Woiczinski | F01D 5/048 |

FOREIGN PATENT DOCUMENTS

| | | |
|---|---|---|
| EP | 3 205 883 A1 | 8/2017 |
| GB | 2 414 769 A | 12/2005 |
| WO | 2014/168855 A1 | 10/2014 |

OTHER PUBLICATIONS

"Scaling Considerations fora Multi-Megawatt Class Supercritical CO2 Brayton Cycle and Commercialization"; Published Nov. 2013 (Year: 2013).*

"Break-even Power Transients for two Simple Recuperated S—CO2 Brayton Cycle Test Configurations"; Published May 24-May 25, 2011 (Year: 2011).*

"Dynamic characteristics of a direct-heated supercritical carbon-dioxide Brayton cycle in a solar thermal power plant"; Published Jan. 3, 2013 (Year: 2013).*

"Operation Results of a Closed Supercritical CO2 Simple Brayton Cycle"; Published Mar. 28-31, 2016 (Year: 2016).*

U.S. Appl. No. 16/283,353, filed Feb. 22, 2019 in the name of Goodhand et al.

U.S. Appl. No. 16/283,043, filed Feb. 22, 2019 in the name of Goodhand et al.

U.S. Appl. No. 16/283,287, filed Feb. 22, 2019 in the name of Goodhand et al.

U.S. Appl. No. 16/283,177, filed Feb. 22, 2019 in the name of Goodhand.

Anselmi, Eduardo et al. "An Overview of the Rolls-Royce sCO2-Test Rig Project at Cranfield University". The 6th International Supercritical CO2 Power Cycles Symposium, 2018.

Monje Brenes, Benjamin. "Design of Supercritical Carbon Dioxide Centrifugal Compressors". Grupo de Maquinas y Motores Termicos de Sevilla, 2014.

Feb. 18, 2019 Search Report issued in British Patent Application No. 1813822.2.

Feb. 18, 2019 Search Report issued in British Patent Application No. 1813821.4.

Feb. 18, 2019 Search Report issued in British Patent Application No. 1813820.6.

Jun. 25, 2020 Office Action Issued in U.S. Appl. No. 16/283,287.

Jun. 25, 2020 Office Action issued in U.S. Appl. No. 16/283,043.

Jul. 1, 2020 Office Action Issued in U.S. Appl. No. 16/283,177.

Jul. 2, 2020 Office Action Issued in U.S. Appl. No. 16/283,353.

Jan. 4, 2021 Office Action issued in U.S. Appl. No. 16/283,177.

Jan. 6, 2020 Office Action issued in U.S. Appl. No. 16/283,353.

Jan. 7, 2021 Office Action issued in U.S. Appl. No. 16/293,043.

Jan. 7, 2020 Office Action issued in U.S. Appl. No. 16/283,287.

* cited by examiner

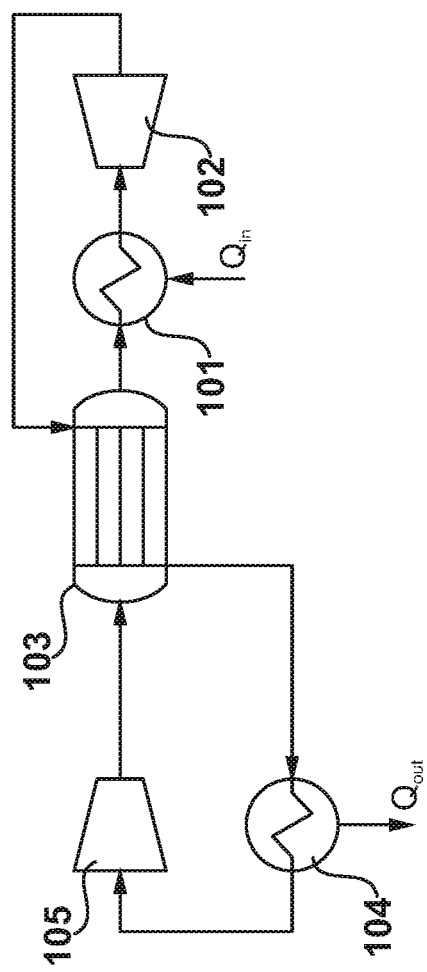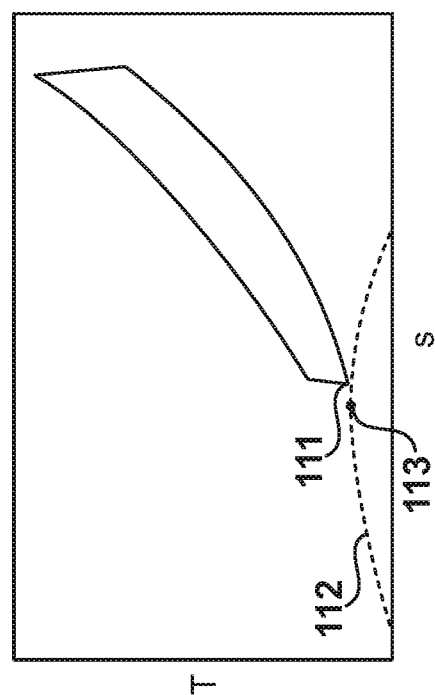
Fig. 1A
Fig. 1B

TURBOMACHINERY

CROSS REFERENCE TO RELATED APPLICATIONS

This application claims priority from United Kingdom Patent Application No 1813822.2 filed Aug. 24, 2018, the whole contents of which are incorporated herein by reference in their entirety.

TECHNICAL FIELD

This disclosure relates to turbomachinery for compressing supercritical carbon dioxide.

BACKGROUND

Whilst the majority of electric power generation using thermal cycles are either open, direct-heated Brayton cycles such as air-breathing gas turbines, or closed, indirect-heated Rankine cycles such as steam turbines, advances in materials technology have made the use of more exotic working fluids feasible.

One working fluid that shows promise for increased efficiency is carbon dioxide ($CO_2$), which may be used in a closed, indirect-heated Brayton cycle. $CO_2$ is attractive because, whilst it becomes supercritical at a fairly high pressure of 7.39 megapascals, its critical temperature is fairly low at 304.25 kelvin which means that heat may be rejected from the cycle at close to ambient temperatures. Further, in its supercritical state, $CO_2$ has an extremely high density (468 kilograms per cubic metre at the critical point), which reduces the attendant size of the turbomachinery used in the cycle.

Whilst there is dense literature on cycle design, little work has been done to investigate and propose practical implementations of turbomachinery that is suitable for compressing supercritical $CO_2$ (hereinafter $sCO_2$).

For example, it is desirable to operate the turbomachine with inlet conditions close to the critical point, as this enables a high pressure rise per unit work. However, doing so means that even small perturbations in inlet conditions can result in the compressibility factor Z of the fluid changing rapidly to be more gas-like than liquid-like. As the fluid becomes more compressible, the working line of the compressor moves as more work is required to achieve a given pressure rise. Unstable operation may therefore ensue if the working line moves too suddenly or too much.

SUMMARY

The invention is directed to turbomachinery suitable for compressing supercritical carbon dioxide, and methods of operation thereof.

In an aspect, a turbomachine of the aforesaid type is provided, the turbomachine comprising, in fluid flow series:
an inlet;
an inducerless radial impeller having a plurality of blades; and
a fully vaneless diffuser;
wherein the radius of the inlet ($r_0$) is from 25 to 50 percent of the radius of the impeller ($r_2$).

BRIEF DESCRIPTION OF THE DRAWINGS

Embodiments will now be described by way of example only with reference to the accompanying drawings, in which:

FIG. 1A is a schematic of a recuperated $sCO_2$ Brayton cycle, including turbomachinery to compress and expand a $CO_2$ working fluid;

FIG. 1B is a temperature-entropy (T–s) diagram of the cycle of FIG. 1A;

DETAILED DESCRIPTION

Figures 2A, 2B:
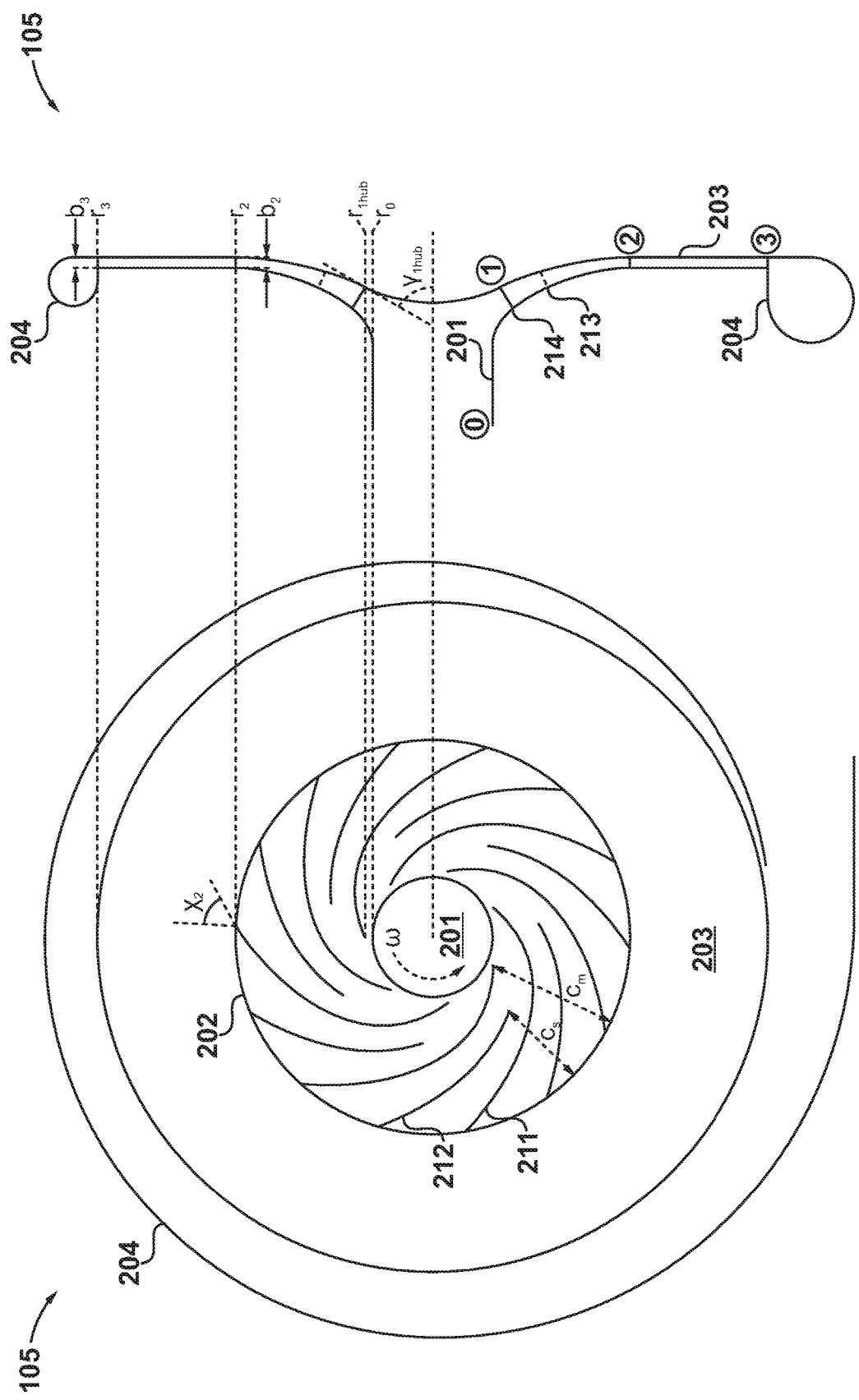
FIG. 2A is a plan view of the compressor of FIG. 1A.
FIG. 2B shows the annulus lines of the compressor of FIG. 1A.

A schematic of a recuperated $sCO_2$ Brayton cycle is shown in FIG. 1A.

The cycle comprises a heater in the form of a first heat exchanger 101, which adds heat, $Q_{in}$, to the $CO_2$ working fluid. The heat may be waste heat from another cycle, with the cycle of FIG. 1A acting as a bottoming cycle, or from any other heat source such as a solar thermal collector, for example.

The heated working fluid is then expanded through a first turbomachine suitable therefor in the form of a turbine 102 to develop shaft power. Following expansion, the $CO_2$ working fluid from the turbine 102 is passed through a recuperator 103 to reduce its temperature. Heat is rejected from the cycle, $Q_{out}$, by a cooler in the form of a second heat exchanger 104.

The cooled $CO_2$ working fluid is then compressed by a second turbomachine suitable therefor, in the form of a compressor 105. Following the compression stage, a quantity of heat is added in the recuperator 103 and the fluid returns to the first heat exchanger 101 for further heating.

FIG. 1B shows a T–s diagram of the cycle of FIG. 1A. The heat rejection in the cooler 104 reduces the temperature of the $CO_2$ working fluid to a minimum point 111 close to the saturation line 112 and the critical point 113 thereon. In this way, the pressure of the working fluid may be increased whilst incurring a minimal increase in temperature.

However, as will be appreciated by those skilled in the art, it is in this region that the properties of the $CO_2$ working fluid are liable to change rapidly.

First, the speed of sound in the $CO_2$ drops to 30 metres per second at the critical point. At constant entropy, it rises to over 120 metres per second with only a 0.1 kelvin temperature increase. This leads to the possibility of high Mach number flow when operating turbomachinery near the critical point.

Second, as the $CO_2$ working fluid enters the compressor 105, it is possible for it to drop in a thermodynamic sense below the saturation line. It is still unknown as to whether a $CO_2$ working fluid will, in a cycle of the type shown in FIG. 1A, actually condense, and, even if it does, what effect this will have.

Thus the embodiments of the compressor 105 described herein provide a turbomachine suitable for compressing $sCO_2$ that take into account these phenomena. FIGS. 2A and 2B show the compressor 105 in plan view and meridional cross section respectively.

The compressor 105 comprises, in fluid flow series, an inlet 201 between stations 0 and 1, an impeller 202 between stations 1 and 2, a diffuser 203 between stations 2 and 3, and, in the present embodiment, a volute 204 following the diffuser 203.

In the present embodiment, the compressor 105 has design inlet conditions of 306 kelvin and at 7.7 megapascals, i.e. just above the critical point of the $CO_2$ working fluid.

Further, the compressor 105 is configured to have a design point stagnation pressure ratio of 2.

As described previously, the properties of the $CO_2$ working fluid around the critical point impose a requirement for stable operation of the turbomachinery across a wide range of conditions.

Thus, the impeller 202 is inducerless, i.e. it does not include an initial set of blades configured to create an axial pressure rise. Instead, the impeller 202 is a purely radial impeller, configured to produce only a centrifugal pressure rise in the $CO_2$ working fluid. This reduces any time period in which the flow is subcritical, which may occur as the fluid accelerates through the impeller. Further, the radial impeller will continue to operate stably with little or no pressure drop should it enter stall.

To reduce the risk of condensation, the inlet 201 is large relative to the size of the impeller to facilitate sufficient margin in inlet velocity for a given mass flow to the velocity at which the flow becomes subcritical. The radius of the inlet $r_0$ is thus from 25 to 50 percent of the radius of the impeller $r_2$.

The radius of the inlet $r_0$ may alternatively be from 30 to 50 percent of the radius of the impeller $r_2$. In the specific embodiment of FIGS. 2A and 2B, $r_0$ is 34 percent of $r_2$.

Further, the diffuser 203 is fully vaneless, i.e. there is no vaned space in addition to vaneless space. This provides the widest possible operating range due to increased stability margin. (Vaneless diffusers are less susceptible to stall under low flow conditions than vaned diffusers.) In the embodiment shown in FIGS. 2A and 2B, the inlet 201 is radially flared so as to introduce a radial component in the flow prior to entry into the impeller 202 at station 2. In an embodiment, this may be achieved by configuring the annulus lines of the compressor 105 (FIG. 2B) so that the hub hade angle at station 1, denoted $\gamma_{1hub}$, to between 50 and 70 degrees. In the present example, the hub hade angle $\gamma_{1hub}$ is 60 degrees to strike a balance between amount of flow turning and reducing risk of separation.

To further increase stability margin, in the present embodiment the impeller 202 has backswept blades. Compressors typically feature only modest backsweep to keep tip speeds and peak stresses under control. However, the use of $CO_2$ as the working fluid and its attendant high density results in a lower impeller tip radius for a given shaft speed than the equivalent air compressor operating at the same pressure ratio. Consequently, centrifugal loading is reduced. In terms of stress, the impeller 202 experiences, like a pump, predominantly blade pressure forces. These are dictated primarily by blade height, rather than backsweep.

Thus an opportunity exists to implement high levels of backsweep, which reduces the absolute Mach number at the impeller exit thereby reducing losses in the diffuser 203 and improving efficiency. In the present embodiment, for instance, the flow relative Mach number at the entry to the diffuser 203 is 0.44.

The sweep of a blade in a radial compressor may be defined by the blade exit angle, which is also known as blade metal angle. This angle is denoted $\chi_2$, distinguishing it from the relative exit flow angle $\beta_2$, and is defined relative to the radial direction at the blade tip. The sign convention for $\chi_2$ is such that positive values denote forward sweep, i.e. in the intended direction of rotation $\omega$, whilst negative values denote negative sweep, as is the case with impeller 202. In the present embodiments, $\chi_2$ may for example from $-50$ to $-70$ degrees. In the specific embodiment of FIGS. 2A and 2B, $\chi_2$ is $-60$ degrees.

The use of backsweep also increases the degree of reaction $\Lambda$ of the compressor 105, i.e. the enthalpy rise in the rotor as a proportion of the whole stage. This is beneficial as it is more challenging to achieve high pressure rise in the diffuser 203.

In the present embodiment, the number of blades in the impeller satisfies the requirement that the velocity difference between the suction and pressure surfaces thereon is less than twice the meanline velocity. Thus, in the specific embodiment shown in FIG. 2A the impeller 202 has 14 blades in total. It will be appreciated, however, that in other implementations the blade count may differ.

In the present embodiment, the impeller 202 has a set of main blades 211 and a set of splitter blades 212. In the specific embodiment shown in FIG. 2A, there is an even number main and splitter blades—one splitter blade for every main blade. The splitters are provided such that the impeller 202 is not under-bladed at the exit radius $r_2$, which ensuring that there is not an excess of blades at the inlet radius $r_1$ which would act to increase blockage and the likelihood of condensation.

In the present example, each splitter blade 212 has a leading edge 213 located 30 percent of meridional chord from the leading edge 214 of each main blade 211. Thus the meridional chord length of the splitter blades 212, denoted $c_s$, is 70 percent of the meridional chord length of the splitter blades 212, denoted $c_m$. Each splitter blade 212 is located in the middle of the passage formed between adjacent main blades 211.

As described previously, the diffuser 203 is a fully-vaneless diffuser. Whilst vaned diffusers may give higher efficiencies at their design point, they exhibit reduced stability off-design due to flow separation. A fully vaneless diffuser therefore provides a wider operating range.

In the present embodiment, the length of the diffuser 203 satisfies a requirement to maximise pressure recovery whilst minimising viscous losses. Thus, in an embodiment the radius at the diffuser exit, $r_3$, is from 1.2 to 1.8 times greater than the radius at the diffuser entry, $r_2$. The radius at the diffuser exit, $r_3$, may in another embodiment be from 1.3 to 1.7 times greater than the radius at the diffuser entry, $r_2$. In the specific embodiment shown in FIG. 2A, $r_3$ is 1.7 times greater than $r_2$.

Pressure recovery is aided by, in the present embodiment, having a non-varying passage height for the diffuser 203 over its radial extent, i.e. the height of the diffuser passage at its entry, $b_2$, is the same as the height of the diffuser passage at its exit, $b_3$. The diffuser 203 therefore has an annulus height ratio $b_3/b_2$ of 1.

The volute 204 in the specific embodiment shown in FIG. 2B is of asymmetric configuration, but it will be appreciated that a symmetrical configuration may be used instead.

In the present embodiment, the flow area A of the volute at the tongue is equal to the flow area at the exit of the diffuser 203. This prevents diffusion and thus avoids static pressure distortion at the exit of the diffuser 203, which may affect the stability of the compressor 105.

In operation as part of the cycle of FIG. 1A, the compressor 105 is provided with a supply of $sCO_2$, and the impeller 202 is rotated by the turbine 102. For design point operation, the $sCO_2$ may be provided at the conditions discussed above of 306 kelvin and at 7.7 megapascals, and the impeller 102 may be rotated at 50000 revolutions per minute to achieve the design stagnation pressure ratio of 2. Off-design operation may, however, still be carried out reliably due to the combination of measures discussed herein to improve stability.

For example, the impeller may be rotated at a speed greater than 50000 revolutions per minute, such as 70000 revolutions per minute, to achieve a stagnation pressure ratio of from 3 to 4.

Alternatively a speed less than 50000 revolutions per minute may be used to achieve a stagnation pressure ratio of from 1 to 2.

Alternatively, the compressor may be provided with a different design point parameter set depending on the overall cycle requirements.

Figure 3:
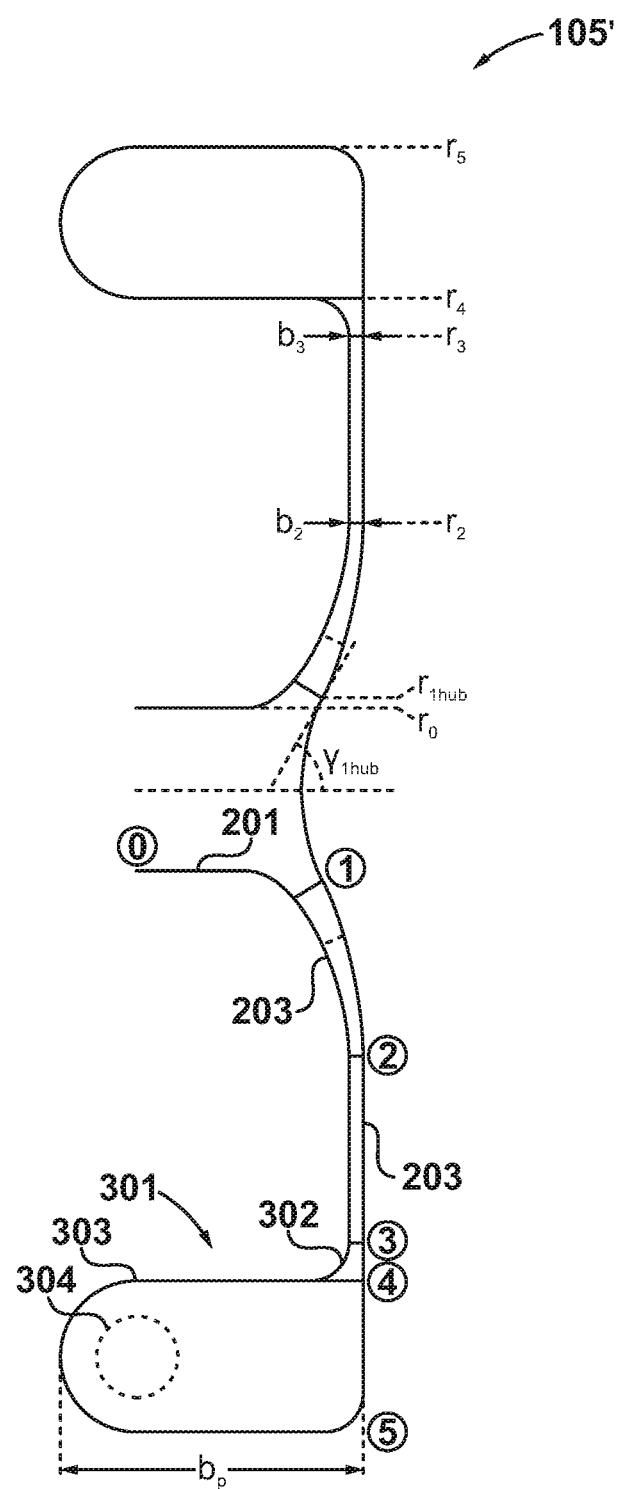
FIG. 3 shows an alternative configuration of the compressor.

A different embodiment of the compressor is shown in FIG. 3, and is identified as compressor 105'. The compressor 105' is largely the same in configuration as compressor 105, and thus includes inlet 201, impeller 202 and diffuser 203 as described previously. However, in the embodiment shown in the Figure, the collector is a plenum 301 rather than the volute 205.

In the present example, the plenum 301 is substantially axisymmetric. This may simplify manufacture. The plenum 301 includes an offtake 302 for connection of the compressor 105' to the rest of the cycle of FIG. 1. In the present embodiment, the plenum 301 includes an entrance 302 extending radially between station 3 and a station 4, and a chamber 303 between station 4 and a station 5. In the present example, the radial extent of the chamber 303, equal to $r_5 - r_4$, is one third of the length of the diffuser 203, i.e. $r_3 = 3(r_5 - r_4)$. In the present embodiment, the chamber 303 has a height that is at least twice its width.

As shown in FIG. 3, the configuration of the plenum 301 is such that the offtake 302 is located out of the plane of the diffuser 203. This may assist in terms of reducing swirl in the flow exiting the diffuser 203, particularly as it is of a fully vaneless type. Whilst the total amount of swirl may be reduced, there may still be a small component and thus in the present embodiment the offtake 304 is oriented tangentially with respect to the flow direction to minimise losses.

In the present embodiment, the offtake 302 has a cross-sectional area equal to the cross-sectional area of the inlet 201 divided by the design stagnation point pressure ratio. In the present example therefore, in which the compressor 105' has a design point stagnation pressure ratio of 2, the offtake 302 has a cross sectional area that is half that of the intake 201. Thus, as the design point, the flow rate into and out of the compressor 105' may be substantially equal.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A turbomachine configured to compress supercritical carbon dioxide, the turbomachine comprising, in fluid flow series:
    an inlet;
    an inducerless radial impeller having a plurality of blades; and
    a fully vaneless diffuser;
    wherein a hub hade angle of the impeller at an entry thereto ($\gamma_{1hub}$) is from 50 to 70 degrees, and
    wherein the hub hade angle is defined by an axial line of the inlet and a tangent line that is tangent to a point of the impeller where the blade of the impeller begins.

2. The turbomachine of claim 1, in which a radius of the inlet ($r_0$) is from 30 to 50 percent of a radius of the impeller ($r_2$).

3. The turbomachine of claim 1, in which the inlet is radially flared to induce a radial component in flow prior to an entry to the impeller.

4. The turbomachine of claim 1, in which a radius of the inlet ($r_0$) is from 25 to 50 percent of a radius of the impeller ($r_2$).

5. The turbomachine of claim 1, in which said hade angle ($\gamma_{1hub}$) is 60 degrees.

6. The turbomachine of claim 1, in which each of the plurality of blades is a backswept blade.

7. The turbomachine of claim 6, in which each of the plurality of blades have a blade exit angle ($\chi_2$) of from −50 to −70 degrees.

8. The turbomachine of claim 7, in which each of the plurality of blades have a blade exit angle ($\chi_2$) of −60 degrees.

9. The turbomachine of claim 1, in which the plurality of blades comprises:
    a set of main blades; and
    a set of splitter blades.

10. The turbomachine of claim 9, in which a meridional chord length of the splitter blades ($c_s$) is 70 percent of a meridional chord length of the main blades ($c_m$).

11. The turbomachine of claim 9, in which the impeller comprises one splitter blade for each main blade.

12. The turbomachine of claim 1, in which the diffuser has a height ($b_2$) at an entry of the diffuser and a height ($b_3$) at an exit of the diffuser, with an annulus height ratio and the entry and the exit of the diffuser ($b_3/b_2$) being 1.

13. The turbomachine of claim 1, in which a radius of the diffuser ($r_3$) is from 1.2 to 1.8 times larger than a radius of the impeller ($r_2$).

14. The turbomachine of claim 13, in which the radius of the diffuser ($r_3$) is from 1.3 to 1.7 times larger than the radius of the impeller ($r_2$).

15. The turbomachine of claim 1, further comprising a volute arranged to receive fluid from the diffuser, said volute comprising a tongue and having a flow area at the tongue equal to that of the diffuser.

16. The turbomachine of claim 1, having the inlet, the impeller and the diffuser configured to achieve a design point stagnation pressure ratio of 2 or greater when the impeller is rotated at a speed of at least 50000 revolutions per minute.

17. The turbomachine of claim 1, further comprising a plenum arranged to receive fluid from the diffuser, said plenum comprising a connector having a cross-sectional area equal to the cross-sectional area of the inlet divided by a design point stagnation pressure ratio of the turbomachine that is achieved by a combination of the inlet, the impeller and the diffuser when the impeller is rotated at a speed of at least 50000 revolutions per minute.

18. A method of operating the turbomachine of claim 1, comprising:
    supplying supercritical carbon dioxide to the inlet of the turbomachine; and
    rotating the impeller.

19. The method of claim 18, in which the supercritical carbon dioxide is supplied at 306 kelvin and at 7.7 megapascals and the impeller is rotated with a speed of at least 50000 revolutions per minute.

20. A system that is a closed, indirect-heated Brayton cycle having a carbon dioxide working fluid and comprising the turbomachine of claim 1.

* * * * *